(12) United States Patent
Ahmed

(10) Patent No.: US 11,902,635 B2
(45) Date of Patent: Feb. 13, 2024

(54) RAPID DELIVERY OF BROADCASTED LIVE CONTENT

(71) Applicant: OPENORIGINS LIMITED, London (GB)

(72) Inventor: Mansoor Anwar Ahmed, Birmingham (GB)

(73) Assignee: OPENORIGINS LIMITED, London (GB)

( * ) Notice: Subject to any disclaimer, the term of this patent is extended or adjusted under 35 U.S.C. 154(b) by 63 days.

(21) Appl. No.: 17/858,252

(22) Filed: Jul. 6, 2022

(65) Prior Publication Data
US 2023/0104071 A1    Apr. 6, 2023

(30) Foreign Application Priority Data

Oct. 6, 2021    (IN) .............................. 202111045551

(51) Int. Cl.
| | | |
|---|---|---|
| *H04N 21/8352* | (2011.01) | |
| *H04N 21/266* | (2011.01) | |
| *H04N 21/84* | (2011.01) | |

(52) U.S. Cl.
CPC ... *H04N 21/8352* (2013.01); *H04N 21/26613* (2013.01); *H04N 21/84* (2013.01)

(58) Field of Classification Search
CPC ....... H04L 9/50; H04L 9/3247; H04L 9/3239; H04N 21/8352; H04N 21/84; H04N 21/26613
See application file for complete search history.

(56) References Cited

U.S. PATENT DOCUMENTS

| | | | | |
|---|---|---|---|---|
| 11,075,891 | B1* | 7/2021 | Long | H04L 9/3213 |
| 11,367,060 | B1* | 6/2022 | Barbashin | G06Q 20/389 |
| 2021/0044642 | A1* | 2/2021 | Long | H04L 65/80 |
| 2021/0281410 | A1* | 9/2021 | Hain | G06Q 20/065 |
| 2022/0182700 | A1* | 6/2022 | Utile | G06F 3/167 |
| 2022/0253811 | A1* | 8/2022 | Fowler | H04L 63/08 |

* cited by examiner

*Primary Examiner* — Jason Salce
(74) *Attorney, Agent, or Firm* — Daniel R. Evans; Merchant & Gould P.C.

(57) ABSTRACT

Techniques for rapidly delivering broadcasted live content are described. In an example, a transaction request to create placeholder non-fungible tokens (NFTs) in a token repository (106) is sent, where NFTs represent unique digital items. In response to the transaction request, an address allocated to a placeholder NFT from the plurality of placeholder NFTs in the token repository (106) is received. A notification indicating availability of the piece of live content is then transmitted to a user device (102), where the notification is indicative of the address allocated to the placeholder NFT in the token repository (106). In the meantime, a unique representation of the piece of live content is generated and populated on the token repository (106).

15 Claims, 7 Drawing Sheets

RAPID DELIVERY OF BROADCASTED LIVE CONTENT

This application claims priority to Indian Patent Application No. 202111045551, filed Oct. 6, 2021, the subject matter of which is incorporated herein by reference in its entirety.

BACKGROUND

Content delivery mechanisms for a content is selected based on type of content being delivered. For instance, pre-recorded content, such as short videos, movies and songs are stored on storage devices and made available to users for later consumption. On the other hand, content being broadcasted live, such as sports events, are made available to the users in real-time.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
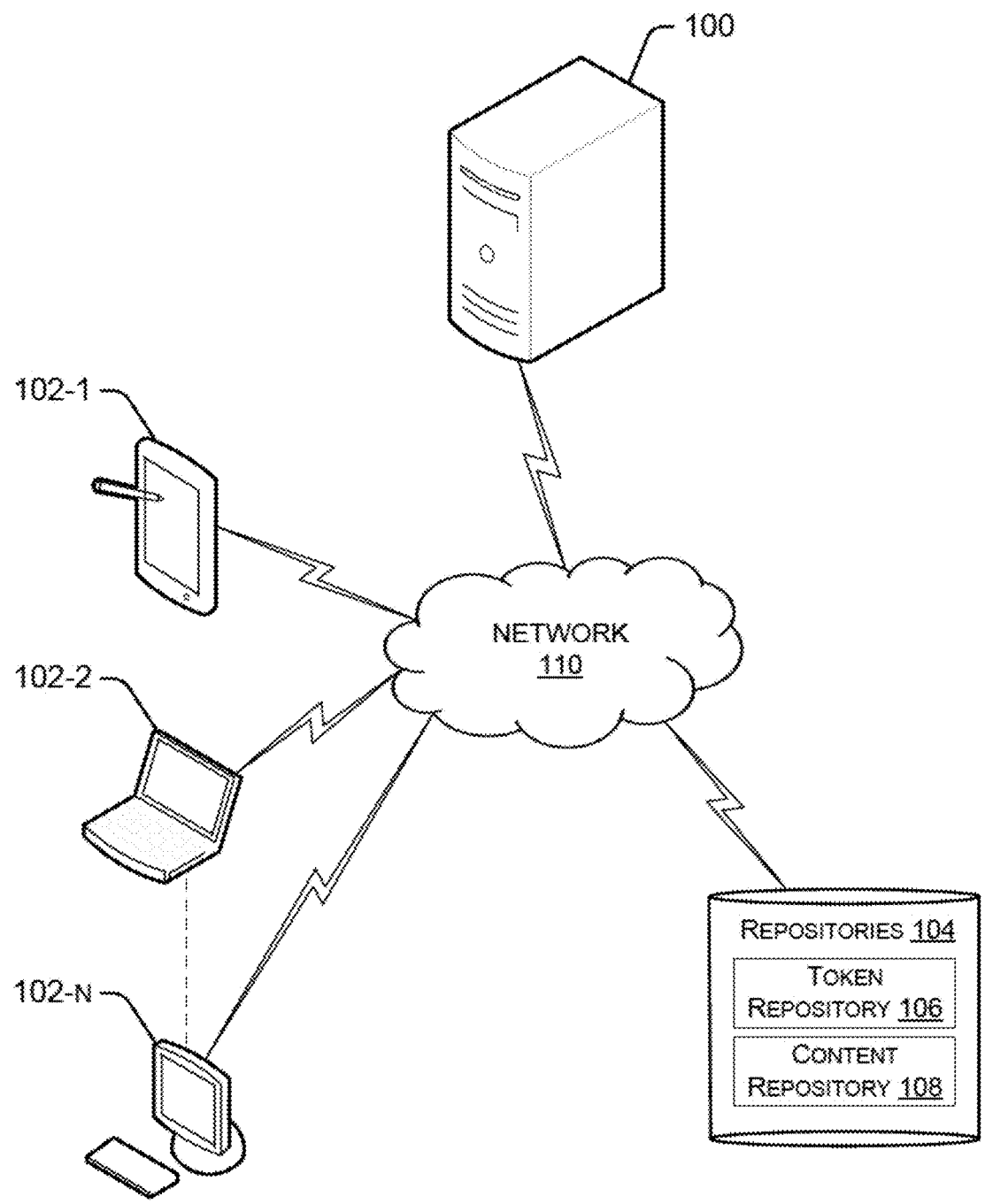
FIG. 1 illustrates a communication network implementing a content delivery server, in accordance with an example of the present subject matter.

Throughout the drawings, identical reference numbers designate similar, but not necessarily identical, elements. The drawings provide examples and/or implementations consistent with the description; however, the description is not limited to the examples and/or implementations provided in the drawings.

DETAILED DESCRIPTION

Generally, it is difficult to access a piece of the live content rapidly after such content has been broadcasted due to delays associated with processing of such piece of the live content for delivery to users.

For instance, a content being broadcasted may be a hockey match. There may be an instance when a player playing at the center forward position may dribble the ball and score a goal by dodging players of the opponent team. It may be identified that spectators watching the broadcast of the hockey match may find this instance interesting and may wish to save a video clip of this broadcasted hockey match for consumption at a later point in time. A video clip including the above-mentioned instance is thus identified as the piece of live content to be delivered to the users. Accordingly, a unique representation, such as a hash value, of the video clip of the hockey match is generated and a transaction request for creation of a non-fungible token (NFT) is sent to a token repository with the unique representation of the video clip as payload.

In response to the transaction request, the NFT is created at the token repository and an address at which the NFT has been stored on the token repository is returned. A notification indicating the availability of the video clip of the hockey match is then sent to users, where the notification includes the address allocated to the NFT.

As known methods entail generation of the unique representation of the piece of live content and populating the unique representation on the NFT before the users can be notified about the availability of the already broadcasted live content, a significant amount of time is utilized in the process, causing delay in providing the piece of the live content to the users. Such delays generally lead to loss of user's interest in time-sensitive information, thereby rendering the information less appealing for the users.

According to example implementations of the present subject matter, techniques for rapidly delivering a broadcasted live content are described.

In an example, the techniques involve notifying the users about the availability of the live content along with the address of the placeholder NFT on the token repository, while generating a unique representation of the live content and uploading the unique representation on the address allocated to the placeholder NFT to reduce the delays involved in processing of the broadcasted live content.

In operation, a transaction request for creation of the placeholder NFT is sent to a token repository. The transaction request may either be sent before the broadcasting of the live content or after the broadcasting of the live content.

In response to the transaction request, the placeholder NFT may be created on the token repository and an address allocated to the placeholder NFT may be determined. When the live content is available for delivery, a notification indicating the availability of the live content may be sent to users, where the notification includes a link pointing to the address allocated to the placeholder NFT. The notification may be displayed to the users on their respective devices. For instance, when the live content being presented is a soccer match and the content to be delivered is a video clip when a player scores a goal, the notification may be presented rapidly after the goal is scored, i.e., the notification may be presented while the soccer match is in progress.

While the notification is provided to the users, a unique representation of the content, such as a hash value or a thumbnail, may be generated and populated on the token repository. Accordingly, when the users visit the link pointing to the address allocated to the placeholder NFT, they may be directed to an address where the unique representation of the content is stored and the content may be retrieved on their respective devices based on the unique representation of the content.

Providing the notification pointing to the address allocated to the placeholder NFT without having to generate the unique representation of the content address allocated to the placeholder NFT reduces the delay associated with processing of piece of live content broadcasted. Accordingly, the broadcasted live content is rapidly delivered to the users for consumption.

The above techniques are further described with reference to FIG. 1 to FIG. 7. It should be noted that the description and the figures merely illustrate the principles of the present subject matter along with examples described herein and should not be construed as a limitation to the present subject matter. It is thus understood that various arrangements may be devised that although not explicitly described or shown herein, statements herein reciting principles, aspects, and implementations of the present subject matter, as well as specific examples thereof, are intended to encompass equivalents thereof.

FIG. 1 illustrates a communication network implementing a content delivery server 100, in accordance with an example of the present subject matter. The content delivery server 100 may either be a standalone computer or a combination of multiple computing devices operating together in a distributed computing environment. In an example, the content delivery server 100, among other functions, may facilitate broadcasting of live content from content providers and broadcasters, to multiple users.

The content delivery server 100 may be connected to multiple user devices 102-1, 102-2, . . . , 102-n and repositories 104, through a network 110. The content delivery server 100 may be communicatively coupled to the user devices 102-1, 102-2, . . . , 102-n and the repositories 104 either through a direct communication link, or through multiple communication links of the network 110.

The user devices 102-1, 102-2, . . . , 102-n may be utilized by users for consumption of live content being broadcasted by the content delivery server 100 or other similar servers. The user device 102-1, 102-2, . . . , 102-n may facilitate reception of content for consumption through multiple channels. For instance, in one example, the user devices 102-1, 102-2, . . . , 102-n may allow reception of content via satellite broadcasting. In another example, the user devices 102-1, 102-2, . . . , 102-n may allow the content to be received via internet protocol (IP) based networks. For the ease of reference, the user devices 102-1, 102-2, . . . , 102-n have been referred to as user device 102, hereinafter. Examples of the user device 102 may include, but are not limited to, smartphones, laptops, desktops, televisions, and personal digital assistants (PDAs).

Further, the repositories 104 may include a token repository 106 and a content repository 108. In an example, the token repository 106 may be used for storing non-fungible tokens (NFTs) and details related to transactions where NFTs may be utilized. An NFT may represent a unique digital item, such as photos, audio, videos, or other type of digital files. The token repository 106 may be a database based on the distributed ledger technology, such as a blockchain. Examples of the types of token repository may include, but are not limited to, public blockchain, private blockchain, hybrid blockchain, and consortium blockchain. The type of token repository 106 being used may vary based on the implementation of the present subject matter. For instance, if the access to the content is to be provided to a larger population, such as viewers of a sports event, a public blockchain may be used. On the other hand, if the access to the content is to be provided to a smaller population having certain permissions, such as employees of an organization, a private or a hybrid blockchain may be used. Further, in said example, the content repository 108 may be a conventional database that may store content represented by the NFTs, that is to be delivered to the users.

Further, the network 110 may be a wireless or a wired network, or a combination thereof. The network 110 can be a collection of individual networks, interconnected with each other and functioning as a single large network. Examples of such individual networks include, but are not limited to, Global System for Mobile communication (GSM) network, Universal Mobile Telecommunications System (UMTS) network, Long Term Evolution (LTE) network, personal communications service (PCS) network, Time-division multiple access (TDMA) network, Code-Division Multiple Access (CDMA) network, next-generation network (NGN), public switched telephone network (PSTN), and Integrated Services Digital Network (ISDN). Depending on the terminology, the communication network includes various network entities, such as gateways and routers; however, such details have been omitted to maintain the brevity of the description.

It would be noted that the communication network may include multiple content delivery servers similar to the content delivery server 100. However, for the ease of understanding, the following explanation have been provided with respect to the content delivery server 100.

In an example implementation, the content delivery server 100 may send a transaction request to the token repository 106, where the transaction request is for creation of a placeholder NFT in the token repository 106.

In an example, in response to the transaction request from the content delivery server 100, the token repository 106 may create the placeholder NFT thereon. The token repository 106 may then transmit an address allocated to the placeholder NFT to the content delivery server 100.

Subsequently, when the live content is broadcasted, the content delivery server 100 may identify a piece of live content to be delivered to user devices. As the piece of live content is identified, the content delivery server 100 may rapidly transmit a notification indicating the availability of the piece of live content to the user device 102. The notification may include a link pointing to the address allocated to the placeholder NFT on the token repository 106.

While the notification indicating the availability of the piece of live content is transmitted to the user device 102, the content delivery server 100 may generate a unique representation of the piece of live content. The unique representation of the piece of live content may include a hash value of the piece of live content or a thumbnail of the piece of live content. In an example, the content delivery server 100 may transmit the notification indicating the availability of the piece of live content and generate the unique representation of the piece of live content, in parallel. In another example, the content delivery server 100 may first transmit the notification indicating the availability of the piece of live content. In said example, the content delivery server 100 may subsequently generate the unique representation of the piece of live content and populate the unique representation at the address allocated to the placeholder NFT on the token repository 106.

Accordingly, when the link is accessed by the user device 102, the user device 102 may be directed to the address where the unique representation of the piece of content is stored and the piece of content may be retrieved on the user device 102 based on the unique representation of the piece of live content.

In an example, when the link is accessed by the user device 102, a request for the piece of live content may be received on the content delivery server 100. Based on the request, the content delivery server 100 may retrieve the unique representation of the piece of content from the token repository 106. Subsequently, the content delivery server 100 may retrieve the piece of live content from the content repository 108 based on the unique representation of the piece of live content and provide the piece of live content to the user device 102. A detailed explanation of implementation of the content delivery server 100 is further provided with reference to explanation of examples in FIG. 2.

Figure 2:
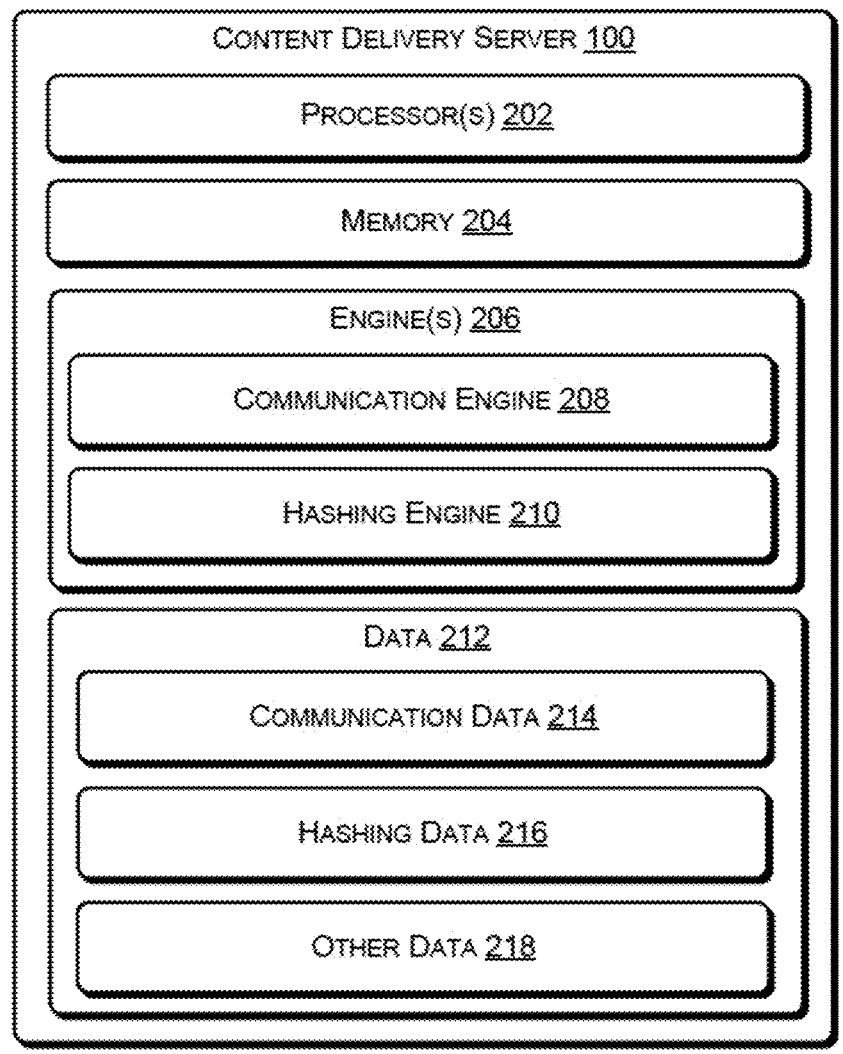
FIG. 2 illustrates schematics of the content delivery server, in accordance with an example of the present subject matter.

FIG. 2 illustrates schematics of the content delivery server 100, in accordance with an example of the present subject matter. As already described, the content delivery server 100 may be connected to the user device 102 and the repositories 104 to facilitate broadcasting of the live content via the network 110. Further, as already described, the repositories 104 may include the token repository 106 and the content repository 108.

The content delivery server 100 may include a processor 202 and a memory 204 coupled to the processor 202. The functions of functional block labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, standard and/or custom, may also be included.

The memory 204 may include any computer-readable medium including, for example, volatile memory (e.g., RAM), and/or non-volatile memory (e.g., EPROM, flash memory, etc.).

The content delivery server 100 may further include engines 206, where the engines 206 may include a communication engine 208 and a hashing engine 210 coupled to the communication engine 208. In an example, the engines 206 may be implemented as a combination of hardware and firmware. In examples described herein, such combinations of hardware and firmware may be implemented in several different ways. For example, the firmware for the engine may be processor executable instructions stored on a non-transitory machine-readable storage medium and the hardware for the engine may include a processing resource (for example, implemented as either a single processor or a combination of multiple processors), to execute such instructions.

In the present examples, the machine-readable storage medium may store instructions that, when executed by the processing resource, implement the functionalities of the engine. In such examples, the content delivery server 100 may include the machine-readable storage medium storing the instructions and the processing resource to execute the instructions. In other examples of the present subject matter, the machine-readable storage medium may be located at a different location but accessible to the content delivery server 100 and the processor 202.

The content delivery server 100 may further include data 212, that serves, amongst other things, as a repository for storing data that may be fetched, received, processed, or generated by the communication engine 208 and the hashing engine 210. The data 212 may include communication data 214, hashing data 216, and other data 218. In an example, the data 212 may be stored in the memory 204.

In an example implementation, the communication engine 208 may send a transaction request to the token repository 106, where the transaction request is for creation of a placeholder NFT on the token repository 106. The communication engine 208 may send the transaction request to the token repository 106 at multiple instances.

In one example, the communication engine 208 may send the transaction request to the token repository before the live content is broadcasted. In another example, the communication engine 208 may send the transaction request to the token repository promptly as the live content is broadcasted.

In an example, in response to the transaction request from the content delivery server 100, the token repository 106 may create thereon, a placeholder NFT and transmit the address of the placeholder NFT to the content delivery server 100.

The communication engine 208 may receive the address allocated to the NFT and store the received address in the communication data 214. Subsequently, as the live content is broadcasted, the communication engine 208 may identify a piece of live content to be delivered to the users.

In an illustrative example, the live content being broadcasted may be a soccer match. There may be an instance during the match when a goalkeeper makes a ground dive and stops an opponent player from scoring a goal. It may be identified that spectators watching the instant soccer match may find this instance interesting and may wish to acquire it for consumption at a later point in time. Accordingly, a video clip including the above-mentioned instance may be identified to be the piece of live content to be delivered to the spectators.

In an example, if the communication engine 208 had already requested the token repository 106 for creation of the placeholder NFT before broadcasting of the live content, the communication engine 208 may send a notification indicating the availability of the piece of live content to the user device 102. The notification may include a link pointing to the address allocated the placeholder NFT.

For instance, in the illustrative example described above, as the placeholder NFT has been created on the token repository and the communication engine 208 already has the address allocated to the placeholder NFT before broadcasting of the live content, the communication engine 208 may send a notification, to user devices being used by the spectators, indicating the availability of the video clip, where the notification includes the link to the address allocated to the placeholder NFT.

In an example, the communication engine 208 may include the link in the notification in multiple formats. In said example, a suitable format for presenting the link on the user device 102 may be identified from the multiple formats based on the capabilities of the user device 102. For instance, if the user device 102 is a television, the link may be presented as a QR code that when scanned using a smartphone may direct the smartphone at the address allocated to the placeholder NFT. Similarly, if the user device 102 is a smartphone or a laptop, the link may be presented as a Uniform Resource Locator (URL) pointing to the address allocated to the placeholder NFT.

While the communication engine 208 transmits the notification to the user device 102, the hashing engine 210 may generate a unique representation of the piece of live content. Examples of the unique representation of the piece of live content may include, but are not limited to, hash value of the piece of live content and thumbnail of the piece of live content. In an example, the communication engine 208 may transmit the notification indicating the availability of the piece of live content and the hashing engine 210 may generate the unique representation of the piece of live content, in parallel. In another example, the communication engine 208 may first transmit the notification indicating the availability of the piece of live content and generate the unique representation thereafter. The hashing engine 210 may subsequently populate the unique representation on the token repository 106.

In an example, the unique representation of the piece of live content may be the hash value of the live content. In said example, the hashing engine 210 may use different hashing algorithms for computing the hash value of the piece of live content. The hashing algorithm being used for computing a hash value of the piece of live content may depend on the type of token repository being used in the implementation of the techniques discussed herein. For instance, when the token repository being used is a Ethereum blockchain, the hashing algorithm being used may be Keccak-256 which is a candidate of Secure Hash Algorithm SHA-3. Similarly, when the token repository being used is bitcoin blockchain, the hashing algorithm being used may be SHA-256.

Continuing the illustrative example described supra, while the notification is being transmitted to the user devices being used by the spectators, the hashing engine 210 generates the unique representation of the video clip and populates the unique representation on the token repository 106. The spectators are thus able to access and retrieve the broadcasted video clip rapidly.

It would be noted that when communication engine 208 sends the request for creation of the placeholder NFT to the token repository 106, the placeholder NFT may be created and stored on a first block on the token repository 106. An address allocated to the placeholder NFT may then be received at the content delivery server 100. In an example, the address allocated to the placeholder NFT may be a unique identifier within the first block. Later, when the hashing engine 210 sends the unique representation of the piece of live content to be populated on the token repository 106, the unique representation may be stored on an $n^{th}$ block on the token repository 106. In an example, the unique representation being sent to the token repository 106 may be accompanied by the address of the placeholder NFT. In said example, on the reception of the unique representation and the address of the placeholder NFT, a smart contract associated with the token repository 106 may be updated to link the unique representation of the piece of live content on the $n^{th}$ block and the address of the placeholder NFT. In this manner, when the request for the piece of live content is received with the address allocated to the placeholder NFT, the delivery of the piece of live content may be facilitated based on instructions included in the smart contract.

In another example, the communication engine 208 may send the transaction request for the creation of the placeholder NFT when the live content is being broadcasted. In said example, the communication engine 208 may send the transaction request for creation of the placeholder NFT promptly as the piece of live content to be delivered to user device 102 is identified.

In an example, in response to the transaction request from the content delivery server 100, the token repository 106 may create thereon, a placeholder NFT and transmit the address of the placeholder NFT to the content delivery server 100.

The communication engine 208 may receive the address allocated to the placeholder NFT. Based on reception of the address allocated to the placeholder NFT, the communication engine 208 may send a notification indicating the availability of the piece of live content to the user device 102. The notification may include a link pointing to the address allocated the placeholder NFTs. As already described, the link may be presented in multiple formats based on the capabilities of the user device 102.

In an example, the hashing engine 210 may subsequently generate the unique representation of the piece of live content and populate the same at the address allocated to the placeholder NFT. As already described, when the unique representation being generated is the hash value of the piece of live content, the hashing engine 210 may use different hashing algorithms for computing the hash value of the piece of live content, where the hashing algorithm being utilized may depend on the type of token repository being used in the implementation of the techniques discussed herein.

As already described, when communication engine 208 sends the request for creation of the placeholder NFT to the token repository 106, the placeholder NFT may be created and stored on a first block on the token repository 106. An address allocated to the placeholder NFT may then be received at the content delivery server 100. In an example, the address allocated to the placeholder NFT may be a unique identifier within the first block. Later, when the hashing engine 210 sends the unique representation of the piece of live content to be populated on the token repository 106, the unique representation may be stored on an $n^{th}$ block on the token repository 106. In an example, the unique representation being sent to the token repository 106 may be accompanied by the address of the placeholder NFT. In said example, on the reception of the unique representation and the address of the placeholder NFT, a smart contract associated with the token repository 106 may be updated to link the unique representation of the piece of live content on the $n^{th}$ block and the address of the placeholder NFT. In this manner, when the request for the piece of live content is received with the address allocated to the placeholder NFT, the delivery of the piece of live content may be facilitated based on instructions included in the smart contract.

Accordingly, when the link pointing to the address allocated to placeholder NFT is accessed on the user device 102, the piece of live content may be delivered to the user device 102. In an example, when the link is accessed by the user device 102, the communication engine 208 may receive a request for the piece of live content. Based on the request, the communication engine 208 may retrieve the unique representation of the piece of live content from the token repository 106. Subsequently, the communication engine 209 may retrieve the piece of live content from the token repository 106 based on the unique representation of the piece of live content retrieved from the token repository 106 and provide the piece of live content to the user device 102.

In another illustrative example, the live content being broadcasted may be a discussion among different esteemed personalities being organized via video conferencing. There may be an instance during the discussion where one of the participants of the discussion may make an important disclosure related to the topic being discussed. It may be identified that the viewers may find this instance interesting and may wish to save it for later view. Thus, a video clip including the above-mentioned instance may be identified to be the piece of live content to be delivered to the spectators.

In such a situation, the communication engine 208 may send a transaction request to the token repository 106 for creation of the placeholder NFT. The communication engine 208, in response to the request, may receive an address allocated to the placeholder NFT from the token repository 106. The communication engine 208 may subsequently send a notification indicating the availability of the video clip to user devices being used by the viewers, where the notification may include the link to the address allocated to the placeholder NFT. The hashing engine 210 engine may subsequently generate the unique representation of the video clip and populate the unique representation on the token repository 106. The viewers may thus be able to access and retrieve the broadcasted video clip rapidly.

It would be noted that while it has been described that the transaction request sent by the communication engine 208 is for creation of one placeholder NFT on the token repository 106, the same has been described for the ease of explanation and the transaction request may also be sent for creation of multiple placeholder NFTs on the token repository 106. In such a situation, in response to the transaction request, multiple placeholder NFTs may be created on the token repository 106. Accordingly, the communication engine 208 may receive addresses allocated to the multiple placeholder NFTs on the token repository 106. When a piece of content is identified for delivery to a user device, the communication engine 208 may send a notification indicating availability of the piece of content, where the notification may include a link to the address allocated to a placeholder NFT from the multiple placeholder NFTs. Similarly, when other pieces of content are subsequently identified for delivery to the user device 102, the communication engine 208 may send notifications corresponding to each of the other pieces of content, without having to resend the transaction requests for creation of placeholder NFTs to the token repository 106.

Providing the notification pointing to the address allocated to the placeholder NFT without having to generate the unique representation of the piece of live content reduces the delay associated with processing of live content being broadcasted. Accordingly, the piece of live content is rapidly delivered to the user device 102 for consumption.

Figure 3:
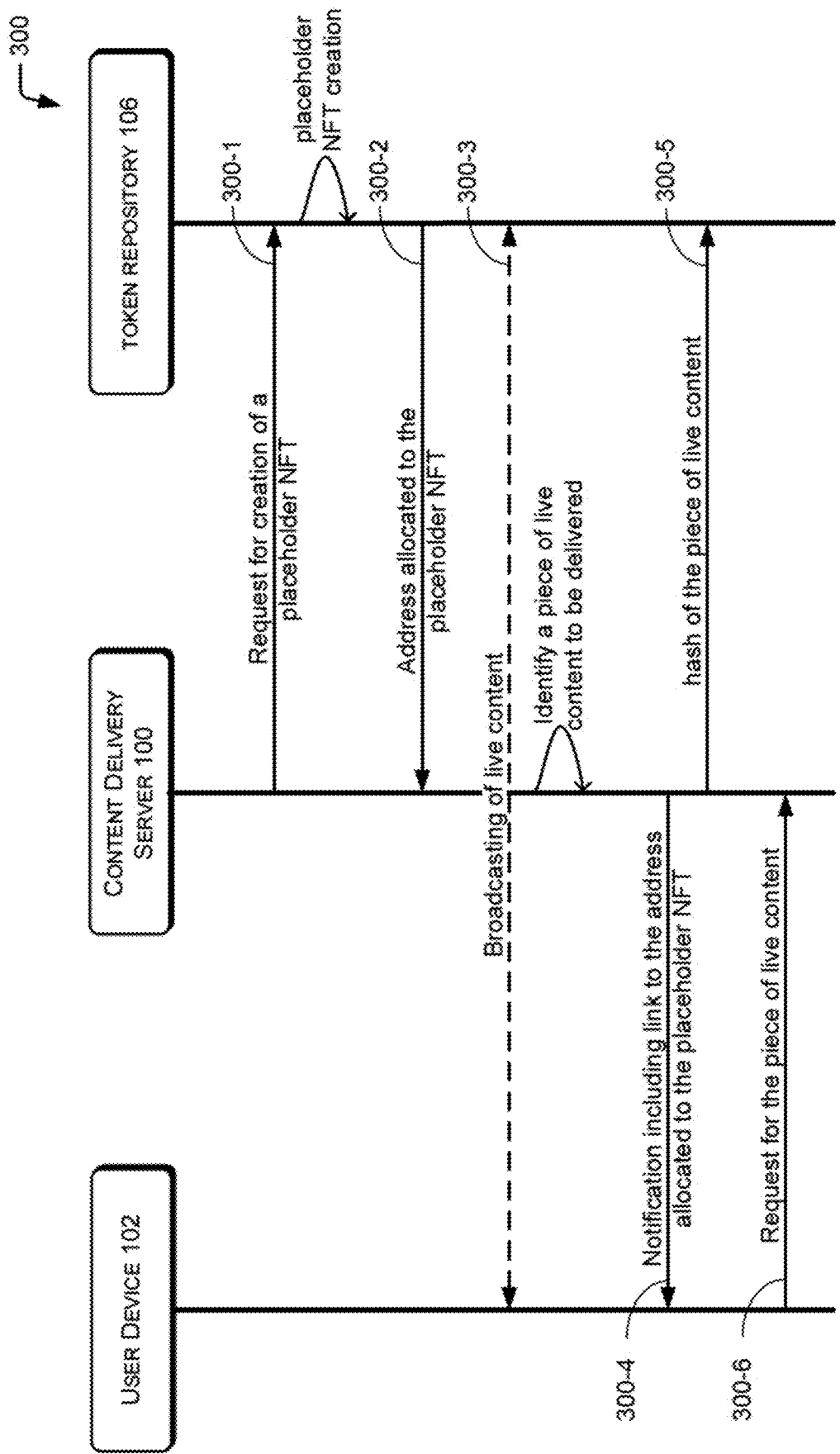
FIG. 3 illustrates a call flow, indicating rapid delivery of broadcasted live content, in accordance with an example of the present subject matter.

FIG. 3 illustrates a call flow 300, indicating rapid delivery of broadcasted live content, in accordance with an example of the present subject matter.

In the call flow 300, at step 300-1, a content delivery server 100 sends a transaction request for creation of a placeholder NFT to the token repository 106. In an example, based on the transaction request received from the content delivery server 100, the token repository 106 may create a placeholder NFT. At step 300-2, the token repository 106 may send an address allocated to the placeholder NFT to the content delivery server 100.

Subsequently, at step 300-3, the live content may be broadcasted. In an example, during the broadcasting of the live content, the content delivery server 100 may identify a piece of live content to be delivered to users. Accordingly, at step 300-4, the content delivery server 100 may send a notification to the user device 102 indicating the availability of the piece of live content, where the notification may include a link to the address allocated to the placeholder NFT on the token repository 106. The content delivery server 100 may include the link in the notification in multiple formats. A suitable format for presenting the link on the user device 102 may be identified based on the capabilities of a user device 102. For instance, if the user device 102 is a television, the link may be presented as a QR code or a bar code. On the other hand, if the user device 102 is a smartphone, the link may be presented as a URL that may be easily accessed by a user from the smartphone itself while watching the live content, such that, the piece of live content may be easily retrieved.

At step 300-5, the content delivery server 100 may compute the hash value of the piece of live content and populate the same on the token repository 106.

It would be noted that, in an example, the content delivery server 100 may transmit the notification indicating the availability of the piece of live content and compute the hash value of the piece of live content, in parallel. In another example, where the content delivery server 100 does not have parallel processing capabilities, the content delivery server 100 may transmit the notification indicating the availability of the piece of live content followed by computing the hash value of the piece of live content. However, it would be noted that in such situations, the delay between the transmission of the notification and computation of the hash value may be kept minimum in order to reduce the overall delay involved in providing the piece of live content to the users.

Subsequently, at step 300-6, the user device 102 may send a request for accessing the piece of live content using the link provided in the notification. In an example, the user device 102 may send the request for the piece of live content to the content delivery server 100. It would be noted that while it has been described that the request for the piece of live content is sent to the content delivery server 100, the request for the piece of live content may also be sent to any other server that may have access to the token repository 106 and the content repository 108.

Figure 4:
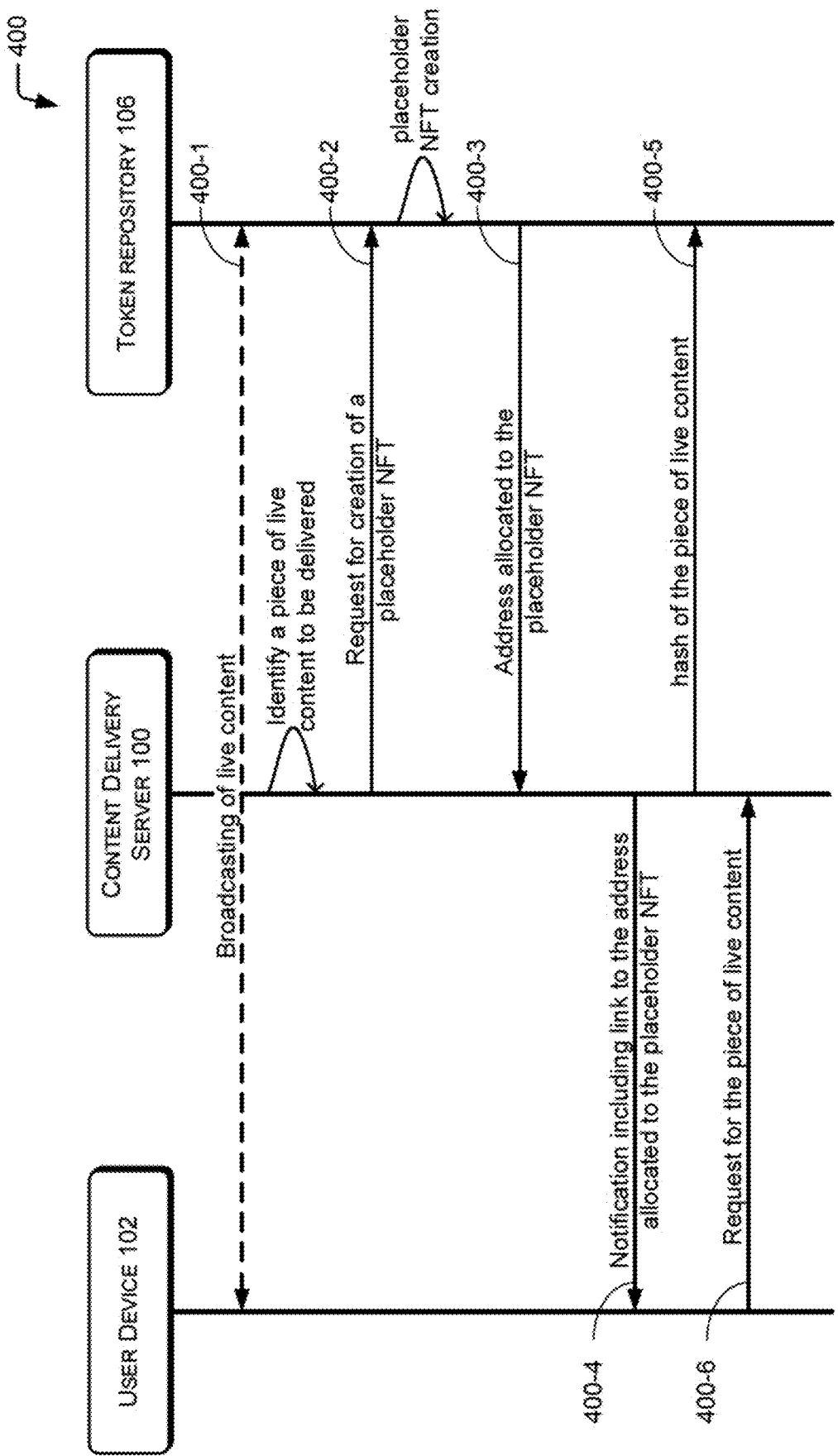
FIG. 4 illustrates another call flow, indicating rapid delivery of broadcasted live content, in accordance with an example of the present subject matter.

FIG. 4 illustrates a call flow 400, indicating rapid delivery of broadcasted live content, in accordance with another example of the present subject matter.

In the call flow 400, at step 400-1, the live content may be broadcasted. In an example, during the broadcasting of the live content, a content delivery server 100 may identify a piece of live content to be delivered to users.

Thereafter, at step 400-2, the content delivery server 100 may send a transaction request for creation of a placeholder NFT to a token repository 106. In an example, based on the transaction request received from the content delivery server 100, the token repository 106 may create a placeholder NFT. At step 400-3, the token repository 106 may send an address allocated to the placeholder NFT to the content delivery server 100.

Subsequently, at step 400-4, the content delivery server 100 may send a notification to a user device 102 indicating the availability of the piece of live content, where the notification may include link to the address allocated to the placeholder NFT on the token repository 106. As already described, the link included in the notification may take any form based on the capabilities of the user device 102.

At step 400-5, the content delivery server 100 may compute the hash value of the piece of live content and populate the same on the token repository 106.

Subsequently, at step 400-6, the user device 102 may send a request for the piece of live content to the content delivery server 100 using the link provided in the notification. Since the notification pointing to the address allocated to the placeholder NFT is provided while populating the hash value of the piece of live content at the address allocated to the placeholder NFT, the delay associated with processing of live content being broadcasted is avoided. Accordingly, the piece of live content is rapidly delivered to the user device for consumption.

Figure 5:
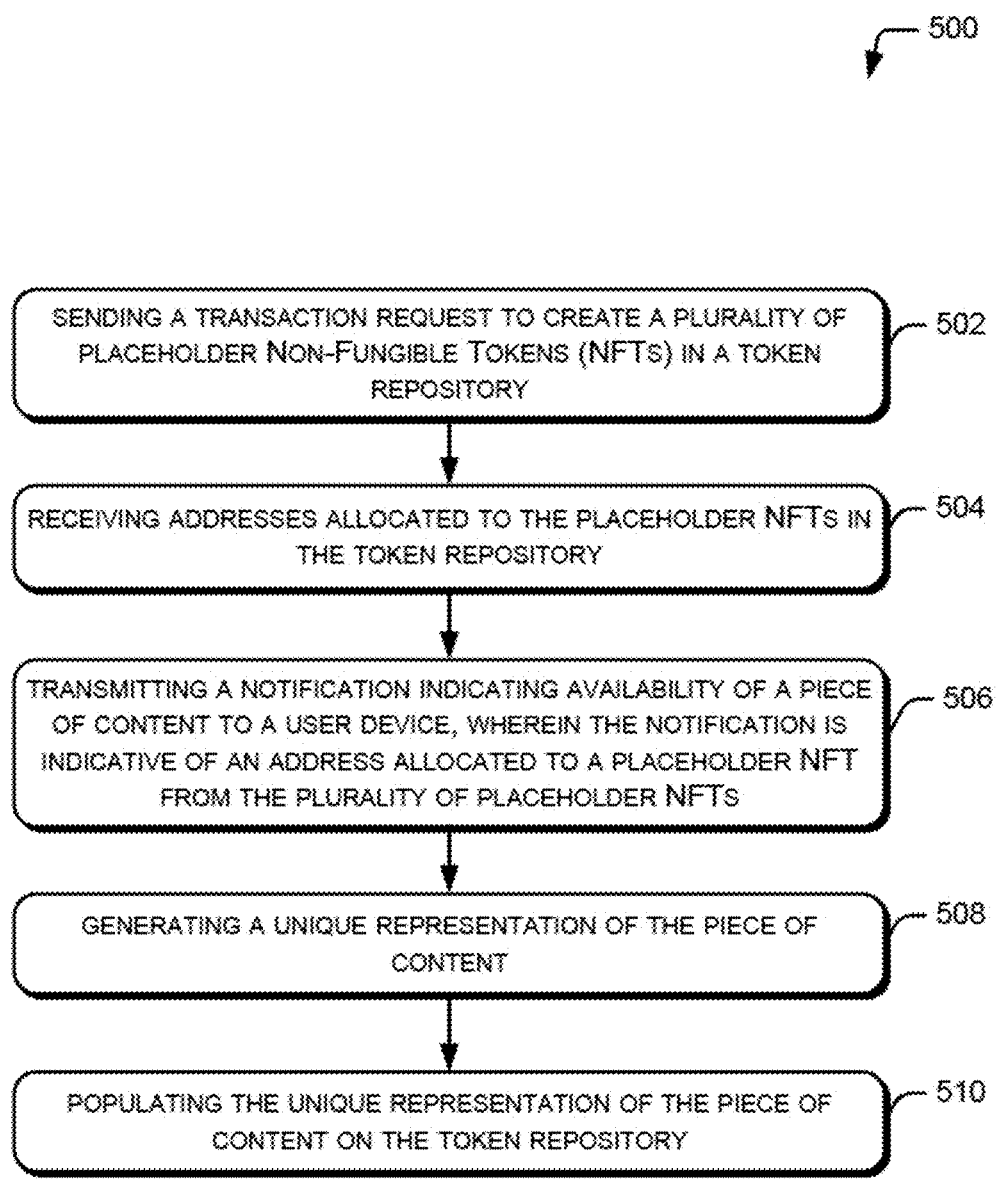
FIG. 5 illustrates a method for rapidly delivering broadcasted live content, in accordance with an example of the present subject matter.
Figure 6:
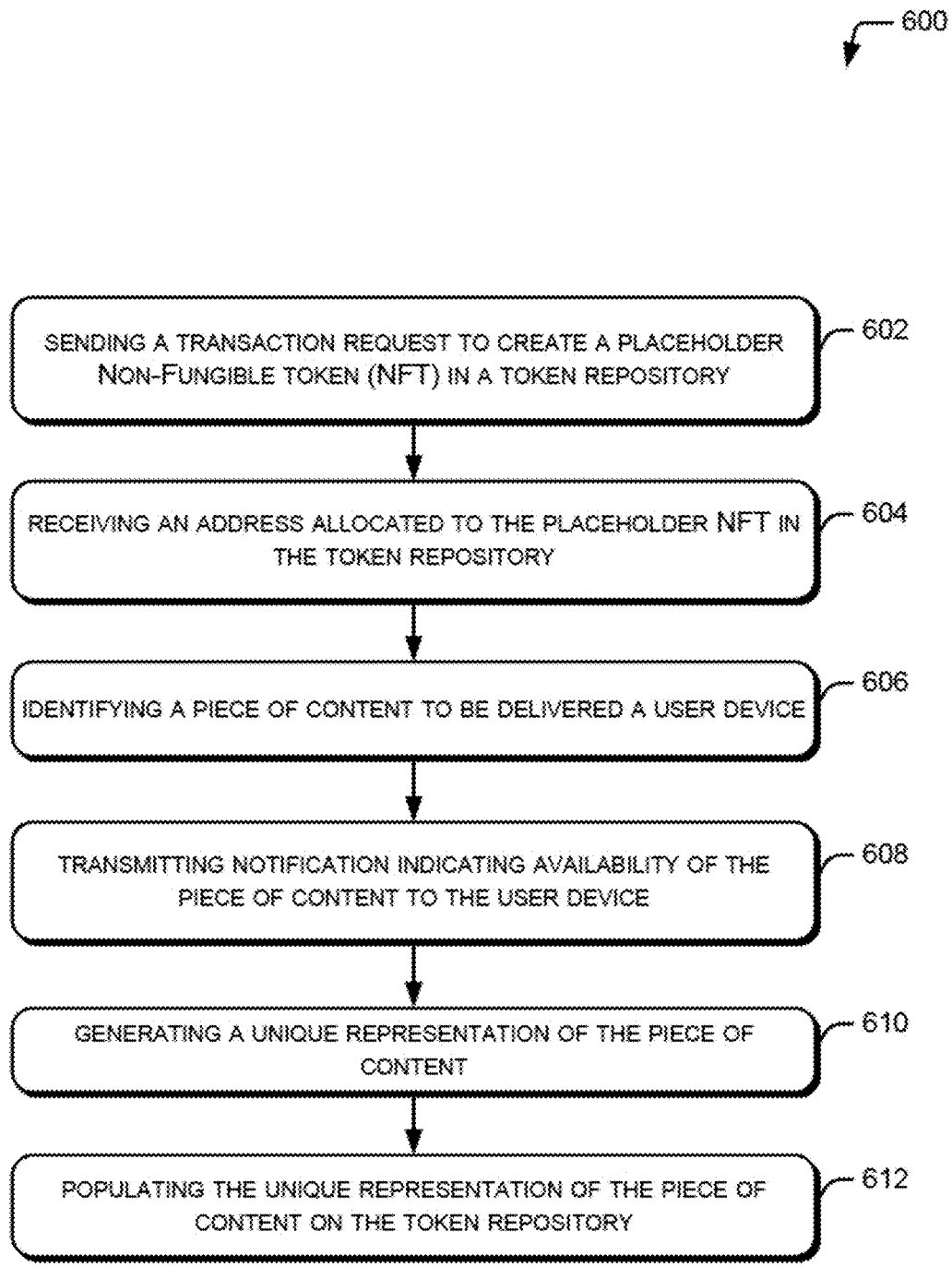
FIG. 6 illustrates another method for rapidly delivering broadcasted live content, in accordance with an example of the present subject matter.

FIGS. 5 and 6 illustrate methods 500 and 600 for rapid delivery of broadcasted live content, in accordance with examples of the present subject matter. Although the methods 500 and 600 may be implemented in a variety of devices, but for the ease of explanation, the description of the methods 500 and 600 is provided in reference to the above-described content delivery server 100. The order in which the methods 500 and 600 are described is not intended to be construed as a limitation, and any number of the described method blocks may be combined in any order to implement the methods 500 and 600, or an alternative method.

It may be understood that blocks of the methods 500 and 600 may be performed in the content delivery server 100. The blocks of the methods 500 and 600 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 502, a transaction request may be sent to create a plurality of placeholder NFTs in a token repository, where NFTs may represent unique digital items. In an example, in response to the request, the plurality of placeholder NFTs may be created in the token repository. In an example, the transaction request for creation of the plurality of placeholder NFTs may be sent at multiple instances. For instance, in an example, the transaction request may be sent before broadcasting of the live content. In another example, the transaction request may be sent after broadcasting of the live content. In an example, the transaction request may be sent by the communication engine 208.

At block 504, addresses allocated to the plurality of placeholder NFTs in the token repository may be received. In an example, the addresses allocated to the placeholder NFT may be received by the communication engine 208.

At block 506, a notification indicating availability of a piece of content may be transmitted to a user device. The notification indicating the availability of the piece of content may be indicative of an address allocated to a placeholder NFT from the plurality of placeholder NFTs. Further, the piece of content may be selected from the live content being broadcasted. In an example, when another piece of content is subsequently identified for transmission to the user device, another notification indicating the availability of the other piece of content may be transmitted to the user device. The notification indicating the availability of the other piece of content may include a link to another address allocated to another placeholder NFT from the plurality of placeholder NFTs. In said example, the other notification may be transmitted without having to resend the transaction request for creation of a placeholder NFT to the token repository. The notifications indicating availability of the piece of content may be transmitted to the one or more user devices by the communication engine 208.

At step 508, a unique representation of the piece of content may be generated. In an example, the unique representation may be one of a hash value of the piece of live content or a thumbnail of the piece of live content. In said example, the unique representation of the one piece of content may be generated by the hashing engine 210.

At block 510, the unique representation of the piece of content may be populated on the token repository. In an example, the unique representation of the piece of content may be populated on the token repository by the hashing engine 210.

FIG. 6 illustrates a method 600 for rapid delivery of broadcasted live content, in accordance with an example of the present subject matter.

At step 602, a transaction request may be sent to create a placeholder NFT in a token repository. NFT may represent a unique digital item, such as photos, audio, videos, or other type of digital files. Further, the token repository may be a database based on the distributed ledger technology, such as a blockchain. In an example, the transaction request may be sent to create the placeholder NFT in a first block on the token repository. In said example, the transaction request may be sent by a communication engine 208 of the content delivery server 100.

At step 604, an address allocated to the placeholder NFT in the token repository may be received. In an example, the address allocated to the placeholder NFT may be unique identifier within the first block on the token repository. In said example, the address allocated to the placeholder NFT may be received by the communication engine 208.

At step 606, a piece of content to be delivered to a user device may be identified. In an example, the piece of content may be selected from live content being broadcasted. In an example, the piece of content to be delivered may be identified by the communication engine 208.

At step 608, a notification indicating availability of the piece of content may be transmitted to the user device. In an example, the notification may include a link that may point to the address allocated to the placeholder NFT on the token repository. In an example, the notification indicating availability of the piece of content may be transmitted to the users by the communication engine 208.

At step 610, a unique representation of the piece of content may be generated. In an example, the unique representation of the piece of content may be generated by the hashing engine 210.

At step 612, the unique representation of the piece of content may be populated on the token repository. In an example, the unique representation of the piece of content may be populated on an $n^{th}$ block on the token repository. In said example, a smart contract associated with the token repository may be subsequently updated to link the unique representation of the piece of content on the $n^{th}$ block and the address of the placeholder NFT. In an example, the unique representation of the piece of content may be populated on the token repository by the hashing engine 210.

As the notification pointing to the address allocated to the placeholder NFT is provided while populating the unique representation of the piece of content at the address allocated to the placeholder NFT, the delay associated with processing of live content being broadcasted is avoided, thereby ensuring rapid delivery of live content to the users.

Figure 7:
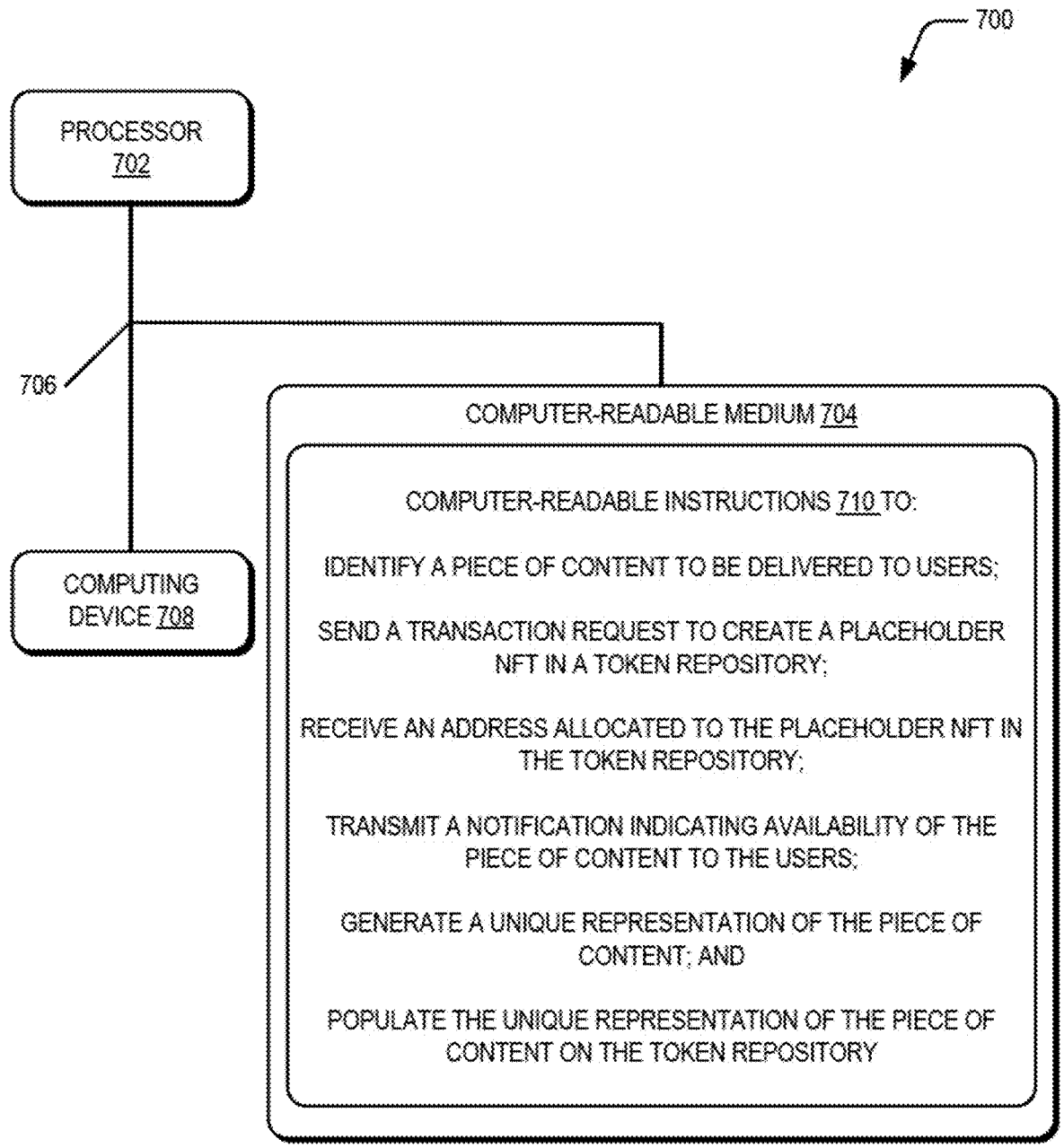
FIG. 7 illustrates a non-transitory computer-readable medium for facilitating rapid delivery of broadcasted live content, in accordance with an example of the present subject matter.

FIG. 7 illustrates a computing environment 700 implementing a non-transitory computer readable medium for facilitating rapid delivery of broadcasted live content, in accordance with an example of the present subject matter. In an example, the computing environment 700 includes processor 702 communicatively coupled to a non-transitory computer readable medium 704 through communication link 706. In an example, the processor 702 may have one or more processing resources for fetching and executing computer-readable instructions from the non-transitory computer readable medium 704. The processor 702 and the non-transitory computer readable medium 704 may be implemented in the content delivery server 100.

The non-transitory computer readable medium 704 may be, for example, an internal memory device or an external memory. In an example implementation, the communication link 706 may be a network communication link, or other communication links, such as a PCI (Peripheral component interconnect) Express, USB-C (Universal Serial Bus Type- C) interfaces, I²C (Inter-Integrated Circuit) interfaces, etc. In an example implementation, the non-transitory computer readable medium 704 includes a set of computer readable instructions 710 which may be accessed by the processor 702 through the communication link 706 and subsequently executed for facilitating rapid delivery of broadcasted live content.

Referring to FIG. 7, in an example, the non-transitory computer readable medium 704 includes computer readable instructions 710 that cause the processor 702 to identify a piece of content to be delivered to users. The piece of content may be selected from the broadcasted live content.

The instructions 710 may further cause the processor 702 to send a transaction request to create a placeholder NFT in a token repository, where NFT represents a unique digital item. The instructions 710 may cause the processor 702 to send the transaction request in response to identification of the content to be delivered. The instructions 710 may cause the processor 702 to send the transaction request to create the placeholder NFT in a first block on the token repository.

In an example, based on the transaction request, a placeholder NFT may be created in the first block in the token repository and an address allocated to the placeholder NFT may be transmitted to the content delivery server 100. In said example, the address allocated to the placeholder NFT may be a unique identifier within the first block on the token repository.

The instructions 710 may further cause the processor 702 to receive an address allocated to the placeholder NFT in the token repository. Furthermore, the instructions 710 may cause the processor 702 to transmit a notification indicating availability of the piece of content to the users, where the notification may include a link that may point to the address allocated to the placeholder NFT on the token repository.

The instructions 710 may further cause the processor 702 to generate a unique representation of the piece of content. Moreover, the instructions 710 may further cause the processor 702 to populate the unique representation of the piece of content at the address allocated to the placeholder NFT on the token repository. In an example, the instructions 710 may cause the processor 702 to populate the unique representation of piece of content at an $n^{th}$ block on the token repository. In said example, the unique representation being sent to the token repository may be accompanied by the address of the placeholder NFT. On the reception of the unique representation and the address of the placeholder NFT, a smart contract associated with the token repository may be updated to link the unique representation of the piece of live content on the $n^{th}$ block and the address of the placeholder NFT. In this manner, when the request for the piece of content is received with the address allocated to the placeholder NFT, the delivery of the piece of content may be facilitated.

Although examples of the present subject matter have been described in language specific to methods and/or structural features, it is to be understood that the present subject matter is not limited to the specific methods or features described. Rather, the methods and specific features are disclosed and explained as examples of the present subject matter.

I claim:

1. A content delivery server for rapidly delivering a piece of live content, the content delivery server comprising:
   a communication engine to:
   send a transaction request to create a placeholder non-fungible token (NFT) in a token repository, wherein NFT represents a unique digital item;
   receive an address allocated to the placeholder NFT in the token repository; and
   transmit a notification indicating availability of the piece of live content to a user device, wherein the notification is indicative of the address allocated to the placeholder NFT in the token repository; and
   a hashing engine coupled to the communication engine to:
   generate a unique representation of the piece of live content; and
   populate the unique representation of the piece of live content on the token repository.

2. The content delivery server as claimed in claim 1, wherein the communication engine is to send the transaction request to create the placeholder NFT before broadcasting of the piece of live content.

3. The content delivery server as claimed in claim 1, wherein the communication engine is to send the transaction request to create the placeholder NFT after broadcasting of the piece of live content.

4. The content delivery server as claimed in claim 1, wherein the communication engine is to:
   receive a request for the piece of live content from the user device;
   retrieve the unique representation of the piece of live content from the token repository based on the request; and
   retrieve the piece of live content from a content repository based on the unique representation of the piece of live content.

5. The content delivery server as claimed in claim 1, wherein the token repository is a database based on a distributed ledger technology.

6. A method comprising:
   sending a transaction request for creation of a placeholder NFT in a token repository,
   wherein NFT represents a unique digital item;
   receiving an address allocated to the placeholder NFT in the token repository WO;
   identifying a piece of content to be delivered to a user device;
   transmitting a notification indicating availability of the piece of content to the user device, wherein the notification is indicative of the address allocated to the placeholder NFT in the token repository;
   generating a unique representation of the piece of content; and
   populating the unique representation of the piece of content on the token repository.

7. The method as claimed in claim 6, wherein sending the transaction request comprises sending the transaction request for creation of the placeholder NFT on a first block on the token repository, wherein the token repository is a blockchain, and wherein the address allocated to the placeholder NFT is a unique identifier within the first block on the blockchain.

8. The method as claimed in claim 7, further comprising:
   populating the unique representation comprises populating the unique representation of the piece of content on an $n^{th}$ block on the blockchain; and
   updating a smart contract associated with the token repository to link the unique representation of the piece of content on the $n^{th}$ block and the address of the placeholder NFT.

9. The method as claimed in claim 6, further comprising:
   receiving a request for the piece of content from the user device;

retrieving the unique representation of the piece of content from the token repository based on the request; and retrieving the piece of content from a content repository based on the unique representation of the piece of content.

10. The method as claimed in claim 8, further comprising transmitting the notification indicating the availability of the piece of content to the user device in at least one of QR code, bar code, and Uniform Resource locator (URL) format.

11. A non-transitory computer readable medium comprising computer-readable instructions that when executed cause a processor of a computing device to:
   identify a piece of content to be delivered to a user device;
   send a transaction request to create a placeholder NFT in a token repository, wherein NFT represents a unique digital item;
   receive an address allocated to the placeholder NFT in the token repository;
   transmit a notification indicating availability of the piece of content to the user device, wherein the notification is indicative of the address allocated to the placeholder NFT in the token repository;
   compute a unique representation of the piece of content; and
   generate the unique representation of the piece of content on the token repository.

12. The non-transitory computer readable medium as claimed in claim 11, wherein the instructions cause the computing device to:
   receive a request for the piece of content from the user device;
   retrieve the unique representation of the piece of content from the token repository based on the request; and
   retrieve the piece of content from a content repository based on the unique representation of the piece of content.

13. The non-transitory computer readable medium as claimed in claim 11, wherein the instructions cause the computing device to transmit the notification indicating the availability of the piece of content to the user device in at least one of QR code, bar code, and Uniform Resource locator (URL) format.

14. The non-transitory computer readable medium as claimed in claim 11, wherein the instructions to send the transaction request is to further cause the computing device to send the transaction request for creation of the placeholder NFT on a first block on the token repository, wherein the token repository is a blockchain, and wherein the address allocated to the placeholder NFT is a unique identifier within the first block on the blockchain.

15. The non-transitory computer readable medium as claimed in claim 14, wherein the instructions to generate the unique representation is to further cause the computing device to:
   populate the unique representation of the piece of content on an $n^{th}$ block on the blockchain:
   update a smart contract associated with the token repository to link the unique representation of the piece of content on the $n^{th}$ block and the address of the placeholder NFT.

\* \* \* \* \*